United States Patent [19]

Nakayama

[11] 4,409,459
[45] Oct. 11, 1983

[54] AUTOMATIC WELDING APPARATUS

[75] Inventor: Shuzi Nakayama, Hatano, Japan

[73] Assignee: Tokico, Ltd., Kawasaki, Japan

[21] Appl. No.: 274,733

[22] Filed: Jun. 18, 1981

[30] Foreign Application Priority Data

Jun. 19, 1980 [JP] Japan .................................. 55-84895
Apr. 20, 1981 [JP] Japan .................................. 56-56666

[51] Int. Cl.³ ....................... B23K 11/10; B23K 37/04
[52] U.S. Cl. ................................. 219/86.24; 219/103;
219/107; 228/44.1 R; 228/49 A
[58] Field of Search ..................... 219/86.24, 101, 103,
219/107, 158, 104, 161; 228/212, 213, 44.1 R,
44.5, 47, 48, 49 R, 49 A, 49 B

[56] References Cited

U.S. PATENT DOCUMENTS 2,106,272  1/1938  Elsey .................................... 219/107
3,042,793  7/1962  Lewis ................................... 219/103
3,946,931  3/1976  Bahnck et al. .................... 228/49 R

FOREIGN PATENT DOCUMENTS 1000147  8/1965  United Kingdom .

Primary Examiner—B. A. Reynolds
Assistant Examiner—Alfred S. Keve
Attorney, Agent, or Firm—Andrus, Sceales, Starke & Sawall

[57] ABSTRACT

An automatic welding apparatus comprises a positioning mechanism successively supplied with a first workpiece, for positioning the first workpiece so that a joint part of the first workpiece faces towards a predetermined direction, a holding and moving mechanism for holding and moving the first workpiece which is positioned by the positioning mechanism, a holding mechanism provided at a position opposing a second workpiece which is successively supplied, for receiving the first workpiece moved by the holding and moving mechanism and holding the first workpiece in a state where the joint part of the first workpiece opposes the second workpiece, and a welding mechanism for welding the first work held by holding mechanism and the second workpiece in a confronting state, at the joint part of the first workpiece.

6 Claims, 7 Drawing Figures

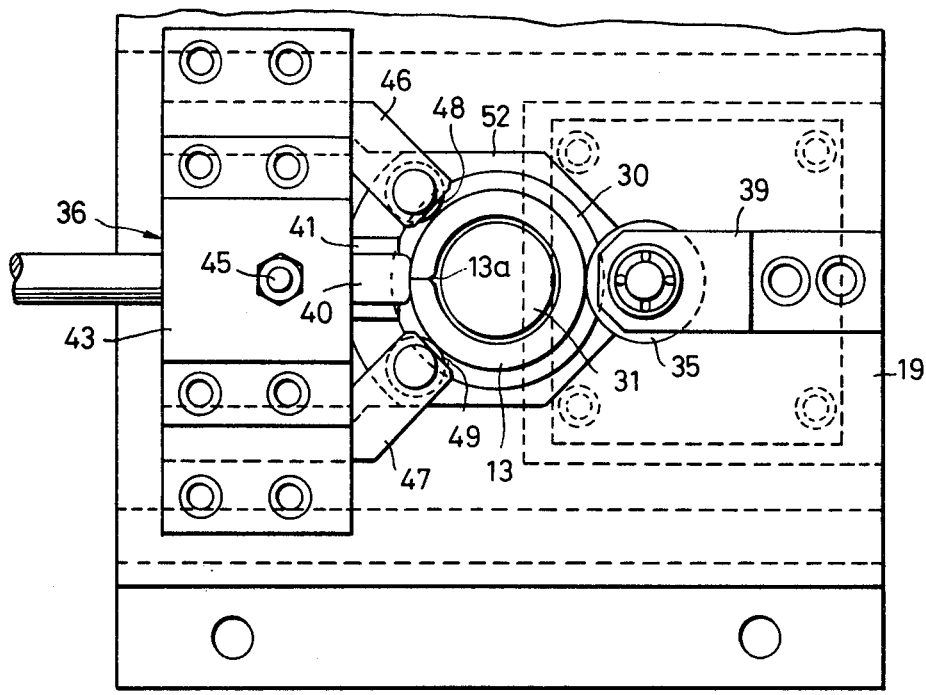
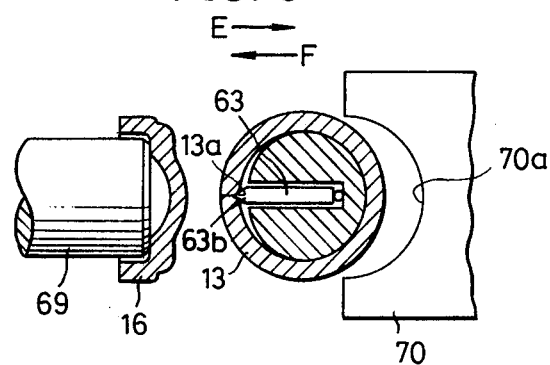
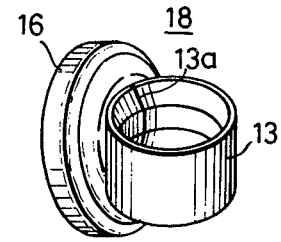

AUTOMATIC WELDING APPARATUS

BACKGROUND OF THE INVENTION

The present invention generally relates to automatic welding apparatuses, and more particularly to an automatic welding apparatus capable of automatically performing a welding operation at a joint part of a rolled mounting eye, to weld the rolled mounting eye to a base cap of a shock absorber of an automobile.

Generally, a base cap having an eye substantially of a short pipe shape is mounted as a bottom lid on one end of a shock absorber used in the suspension of an automobile and the like. An eye-base cap body is constructed so that the eye and the base cap are connected together. Costwise, it is most advantageous to use a rolled mounting eye for the above eye. This rolled mounting eye is formed from a long and narrow plate member which is wound around in a spiral manner, cut along a line parallel to axis of the spirally wound plate, and then pressed in a direction perpendicular to the above axis of the spirally wound plate, to form a plurality of rolled mounting eyes through the above manufacturing stages. However, the rolled mounting eye thus formed has a joint part, which is originally formed by cutting along a line parallel to the axis of the spirally wound plate as described above.

Accordingly, it becomes necessary to fixedly weld the rolled mounting eye to the base cap at the joint part of the rolled mounting eye in order to obtain durability and strength. Thus, an operation is required in which the rolled mounting eye is rotated so that the joint part of the rolled mounting eye opposes the base cap upon welding of the two parts. However, the so-called joint aligning operation to position the rolled mounting eye as described above upon welding, was difficult to automate. Therefore, the above operation to align and position the joint part of the rolled mounting eye so that the joint part opposes the base cap upon welding, was conventionally performed manually. Hence, the production rate of the rolled mounting eye-base cap body was low, and there was a disadvantage in that the production cost of the rolled mounting eye-base cap body became high due to the manual operation which was required. Thus, the realization of an automatic welding apparatus capable of positioning the rolled mounting eye at a predetermined position and automatically performing the welding operation to weld the rolled mounting eye with the base cap at the joint part of the rolled mounting eye, was highly desired.

SUMMARY OF THE INVENTION

Accordingly, a general object of the present invention is to provide a novel and useful automatic welding apparatus in which the above described problems have been overcome.

Another and more specific object of the present invention is to provide an automatic welding apparatus which welds a rolled mounting eye to a base cap at the joint part of the rolled mounting eye, by positioning the rolled mounting eye so that the joint part of the rolled mounting eye opposes the base cap.

Still another object of the present invention is to provide an automatic welding apparatus capable of accurately detecting the position of the joint part of the rolled mounting eye by supporting the rolled mounting eye at three positions along the peripheral direction of the rolled mounting eye to rotate the rolled mounting eye without introducing eccentricity, and accurately positioning the rolled mounting eye so that the joint part of the rolled mounting eye faces towards a predetermined direction.

Other objects and further features of the present invention will be apparent from the following detailed description when read in conjunction with the accompanying drawings.

BRIEF DESCRIPTION OF THE DRAWINGS

FIG. 2 is an enlarged plan view showing a mechanism which positions the rolled mounting eye so that the joint of the rolled mounting eye faces towards a predetermined direction, within the apparatus shown in FIG. 1;

FIG. 6 is a diagram showing a state wherein the rolled mounting eye and the base cap are welded together; and FIG. 7 is a perspective view showing an example of a rolled mounting eye-base cap body manufactured by use of the apparatus shown in FIG. 1.

DETAILED DESCRIPTION

Figure 1:
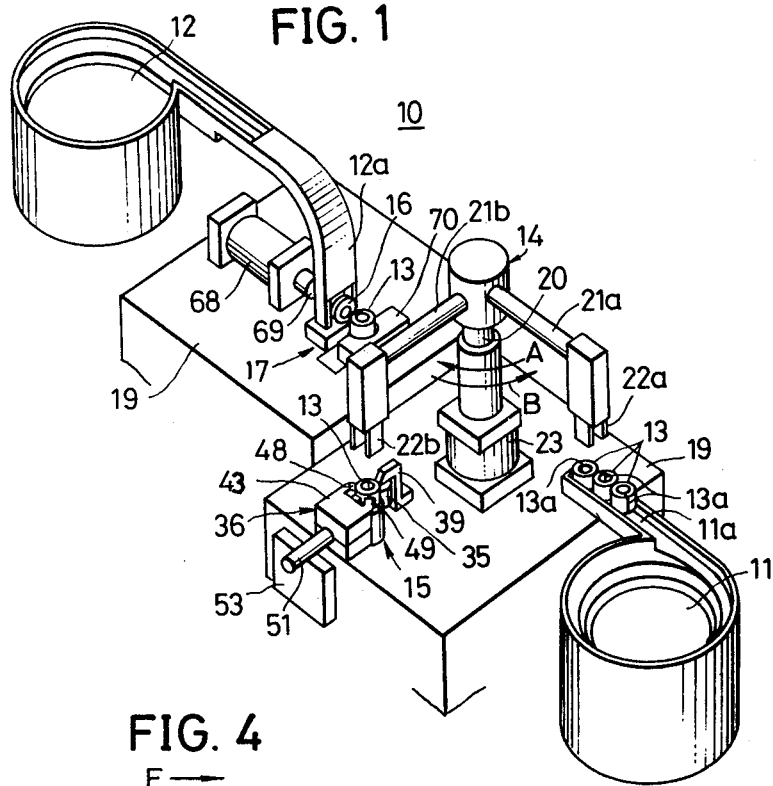
FIG. 1 is a perspective view showing the whole construction of an embodiment of an automatic welding apparatus according to the present invention.

In FIG. 1, an automatic welding apparatus 10 has a pair of parts feeders 11 and 12 for successively and respectively feeding out rolled mounting eyes (hereinafter simply referred to as rolled eyes) and base caps. A loader 14 holds a rolled eye 13 fed from the parts feeder 11, and moves the rolled eye 13 to a following stage. A joint positioning mechanism 15 rotates and positions the rolled eye 13 so that the joint part of the rolled eye 13 faces towards a predetermined direction along the peripheral direction of the rolled eye 13. A welding mechanism part 17 welds the rolled eye 13 and a base cap 16 fed from the parts feeder 12, at the joint part of the rolled eye 13. A rolled eye-base cap body 18 shown in FIG. 7 which is a completed product, is fed out from the welding mechanism 17. The loader 14, the joint positioning mechanism 15, and the welding mechanism 17 are all provided on a base 19.

Next, description will be given with respect to a case where the rolled eye-base cap body 18 is formed by use of the above described automatic welding apparatus 10, in conjunction with concrete constructions of each part of the automatic welding apparatus.

First, the loader 14 operates to hold one rolled eye 13 within a feeding portion 11a of the parts feeder 11, and moves the rolled eye 13 unto the joint positioning mechanism 15. The rolled eyes 13 fed out at the feeding portion 11a of the parts feeder 11, are in a state where the joint parts of the rolled eyes 13 are not arranged in a specific manner. Accordingly, it becomes necessary to position a joint part 13a of the rolled eye 13 so that the joint part 13a opposes the base cap 16, in a stage before the rolled eye 13 is welded to the base cap 16.

The loader 14 has arms 21a and 21b respectively provided on a rotary shaft 20, where the angle formed between the arms 21a and 21b is ninety degrees. Chucks 22a and 22b are respectively provided at the tip end part of the arms 21a and 21b. The loader 14 also has a rotating mechanism (not shown) for rotating the rotary shaft 20 in the directions of arrows A and B by a ninety degree angle, and a cylinder mechanism 23 for moving the rotary shaft 20 upwards and downwards. Therefore, the chucks 22a and 22b respectively move upwards and downwards to hold the rolled eyes 13, and are rotated in the directions of the arrows A and B by an angle of ninety degrees to move the rolled eyes 13. In addition, in relation to the above described construction of the loader 14, the feeding portion 11a of the parts feeder 11, the joint positioning mechanism 15, and the welding mechanism 17 are respectively arranged at a ninety degree angular interval with each other, along the periphery of a circle having the rotary shaft 20 as the center and a diameter equal to the length of the arm 21a. By positioning the feeding portion 11a, the joint positioning mechanism 15, and the welding mechanism 17 along the above circle with the above described interval, the space required to provide the above parts can be reduced compared to a case where the parts are arranged along a straight line. Accordingly, the above described arrangement of the parts is advantageous from the designing point of view.

The chuck 22a of the above loader 14 is lowered from a position shown in FIG. 1 and becomes narrow to hold one rolled eye 13 at the endmost part of the feeding portion 11a. The arm 21a is then raised and rotated in the direction of the arrow A by an angle of ninety degrees, in a state where the rolled eye 13 is held by the chuck 22a. Accordingly, the chuck 22a is stopped directly above the joint positioning mechanism 15, to move downwards and release the rolled eye 13 from the held position. Hence, the rolled eye 13 is loaded onto the joint positioning mechanism 15.

Figure 3:
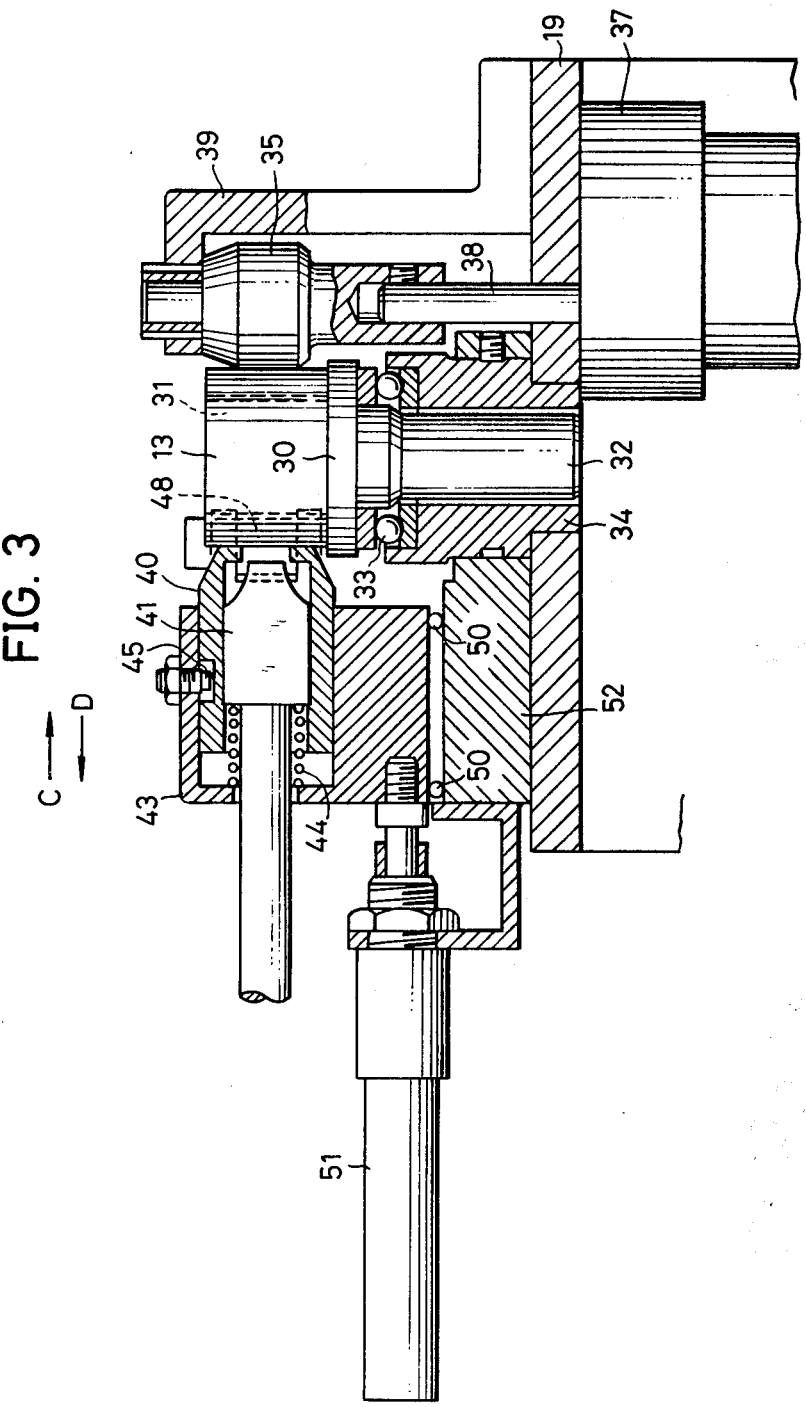
FIG. 3 is a cross-sectional view of the mechanism shown in FIG. 2 seen from the front side.

The joint positioning mechanism 15 is constructed as shown in FIGS. 2 and 3. A supporting base 30 has shaft portions 31 and 32 respectively provided at the upper and lower surfaces thereof. The lower surface of the supporting base 30 is supported by a ball bearing 33, and the supporting base 30 is freely rotatable. The lower shaft portion 32 is inserted into a bearing 34 with a gap formed therebetween. The rolled eye 13 is fit over the upper shaft portion 31 in a state where a gap is formed therebetween, on the support base 30. A driving roller 35 is provided on one side of the support base 30, and a slit detecting device 36 is provided on the other side of the support base 30.

The driving roller 35 is fixed to a rotary shaft 38 of a motor 37 mounted on the base 19. The upper end of the driving roller 35 is supported by a bracket 39 which is fixed to the base 19. Moreover, even when an external force in the radial direction is applied to the driving roller 35, the driving roller 35 is stably held at a predetermined position.

The slit detecting device 36 is provided within a guide member 40, and has a magnetic sensor 41. The guide member 40 is provided so that the guide member 40 is free to move in and out from a depression of a supporting frame 43. The guide member 40 is urged towards the direction of an arrow C by a compressed coil spring 44, and is in a position fixed by a pin 45. Furthermore, a pair of arms 46 and 47 are respectively fixed to the supporting frame 43, and supporting rollers 48 and 49 are respectively provided at the tip end of each of the arms 46 and 47. In addition, wheels 50 are provided on the supporting frame 43, and the supporting frame is operated by a cylinder mechanism 51 and moved in the directions of the arrows C and D on a fixed base 52.

When the rolled eye 13 is placed onto the supporting base 30 as described above, the cylinder mechanism 51 operates and the supporting frame 43 moves in the direction of the arrow C. Accordingly, the supporting rollers 48 and 49 respectively make contact with the rolled eye 13, and push the rolled eye 13 against the driving roller 35. Hence, the rolled eye 13 is held at three positions along the peripheral direction thereof, and positioned by the rollers 35, 48, and 49. In addition, the tip end surface of the guide member 40 makes contact with the outer peripheral surface of the rolled eye 13 due to the operation of the coil spring 44, and the magnetic sensor 41 is always maintained at a position separated by a predetermined distance with respect to the rolled eye 13. Moreover, the shaft portion 31 can be omitted, since the rolled eye 13 is supported at three positions along the peripheral direction thereof as described above.

When the operation to position the rolled eye 13 by the rollers 35, 48, and 49 is completed, the motor 37 is operated. Hence, the roller 35 begins to rotate, and the roll eye 13 rotates at a low speed. When the rolled eye 13 begins to rotate, the magnetic sensor 41 operates to successively detect the magnetic reluctance at the outer periphery of the rolled eye 13. At a point where the joint part 13a of the rolled eye 13 opposes the guide member 40 due to the rotation of the rolled eye 13, the magnetic sensor 41 detects this as a peak in the magnetic variation, to produce a detected output signal. This detected output signal is supplied to the motor 37 through an amplifying unit 53, and the motor 37 is stopped. Accordingly, when the above operation is seen with respect to the rotating plane of the chucks 22a and 22b, the rolled eye 13 is stopped at a position where the joint part 13a of the rolled eye 13 faces towards the outer direction with respect to the above rotating plane.

Since the rolled eye 13 rotates in a state where the outer peripheral surface of the rolled eye 13 is held and supported by rollers 35, 48, and 49 which are provided at positions separated from each other, the rolled eye 13 undergoes a perfect circular rotation and not an eccentric rotation. Accordingly, no bad effects are introduced with respect to the magnetic sensor 41 due to the rotation of the rolled eye 13, and the magnetic sensor 41 can accurately detect the joint part 13a of the rolled eye 13. Moreover, since the inner diameter of the rolled eye 13 is inconsistent, in a case where the rolled eye 13 is rotated in a state where the inner diametrical part of the rolled eye 13 is fitted over the shaft portion, the rolled eye 13 inevitably undergoes eccentric rotation, and the detection of the above joint part 13a cannot be accurately performed. Furthermore, a member such as an arcuate plate member having a small sliding resistance can be used instead of the above rollers 48 and 49.

The cylinder mechanism 51 operates in the reverse direction at a point where the motor 37 is stopped, and the slit detecting device 36 recedes in the direction of the arrow D. In addition, the loader 14 rotationally returns in the direction of the arrow B during the time the above slit detecting operation is performed. Accordingly, the loader 14 is returned into the state shown in FIG. 1.

Next, the loader 14 again operates in a similar manner as in the above case. The chuck 22b holds the rolled eye 13 placed on the support base 30, and moves the rolled eye 13 to the welding mechanism 17. On the other hand, the other chuck 22a holds the rolled eye 13 within the parts feeding portion 11a, and moves this rolled eye 13 to the joint positioning mechanism 15.

Figure 4:
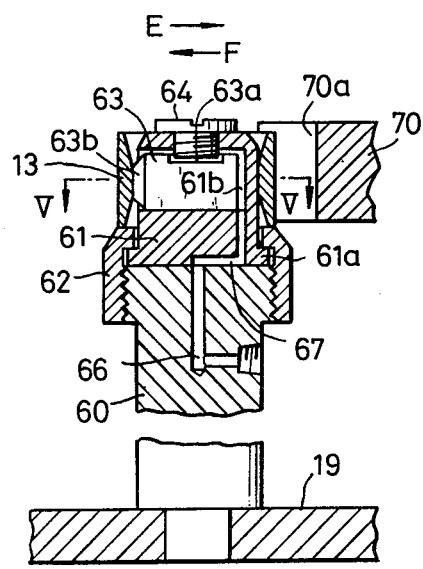
FIG. 4 is a cross-sectional diagram with a part cut away, showing a welding mechanism part of the apparatus shown in FIG. 1.
Figure 5:
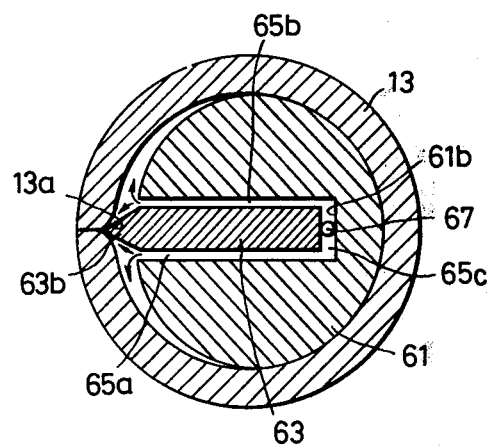
FIG. 5 is a cross-sectional plan view showing the mechanism part shown in FIG. 4 along a line V—V.

Description will now be given with respect to the welding mechanism 17 in conjunction with FIGS. 4, 5, and 6.

A column 60 is provided upright on the base 19. A columnar supporting body 61 having an outer diameter which is slightly smaller than the inner diameter of the rolled eye 13, is fixed to the side of the vertex surface of the column 60 by a nut 62 by use of a rim portion 61a of the columnar supporting body 61. A depression 61b is formed in the diametrical direction of the columnar supporting body 61. A stopping member 63 of a rectangular parallelepiped shaped is inserted into the above depression 61b, in a state where the stopping member 63 is freely movable in the directions of arrows E and F within a range determined by a depression 63a of the stopping member 63 and a stopping screw 64 which is used as a stopper provided at the vertex part of the columnar supporting body 61. Side surface gaps 65a and 65b and a rear surface gap 65c are respectively formed between the stopping member 63 and the depression 61b. These gaps 65a, 65b, and 65c respectively become air passages as will be described hereinafter. Furthermore, compressed air supplied from an air compressor (not shown) flows into the above gap 65c through a passage 66 within the column 60 and a passage 67 within the columnar supporting body 61. Accordingly, the stopping member 63 is urged towards the direction of the arrow F in the diametrical direction of the rolled eye 13 due to the air pressure, and a pointed tip end 63b of the stopping member 63 projects outwards from an opening of the depression 61b.

The columnar supporting body 61 is provided at a height position opposing a tip end of a curved supplying portion 12a of the parts feeder 12. Moreover, a cylinder mechanism 68 is fixed at the rear side of the supplying portion 12a, and an electrode 69 provided at the tip end of a cylinder rod of the cylinder mechanism 68 opposes the base cap 16 which is fed to the tip end portion of the supplying portion 12a. An electrode 70 having a semi-circular portion 70a, is provided at the rear side of the columnar supporting body 61. This electrode 70 is movable in the directions of the arrows E and F by a moving mechanism (not shown).

The rolled eye 13 is fit over the columnar supporting body 61 and placed onto the nut 62 due to the operation of the loader 14. Since the rolled eye 13 is placed onto the nut 62 in a state where the pointed tip end 63b of the stopping member 63 inserted into the joint part 13a of the rolled eye 13, the position of the rolled eye 13 does not deviate in the rotational direction thereof. In the above loaded state, the joint part 13a of the rolled eye 13 opposes the base cap 16 which is vertically provided at the endmost part of the supplying portion 12a.

The cylinder mechanism 68 and the moving mechanism (not shown) respectively operate in the above described state. Therefore, due to the operation of the cylinder mechanism 68, the electrode 69 is inserted into the base cap 16 provided at the end most part of the supplying portion 12a, to move the base cap 16 towards the direction of the arrow E as shown in FIG. 6. In addition, due to the operation of the moving mechanism (not shown), the electrode 70 moves in the direction of the arrow F, and the semi-circular depression 70a of the electrode 70 fits over the rolled eye 13 into which the columnar supporting body 61 is inserted, to support the rolled eye 13. Hence, the rolled eye 13 and the base cap 16 confront each other, held between the electrodes 69 and 70. Thus, the rolled eye 13 and the base cap 16 are welded together at the joint part 13a of the rolled eye 13, and the rolled eye-base cap body 18 shown in FIG. 7 is accordingly completed. After the welding operation is completed, the electrodes 69 and 70 respectively recede, and the above rolled eye-base cap body 18 is obtained through the welding mechanism 17.

Further, even during the above welding operation in which the base cap 16 and the rolled eye 13 are respectively held by the electrodes 69 and 70, the compressed air continues to flow within the gap 65c. Since the pointed tip end 63b of the stopping member 63 is inserted into the joint part 13a of the rolled eye 13 in the above state, the rolled eye 13 is held at the initial rotational position. Moreover, the compressed air is continuously fed through the gaps 65a and 65b during the above welding operation, as shown by arrows in FIG. 5. Accordingly, the compressed air is released towards the part where the pointed tip end 63b of the stopping member 63 is inserted into the joint part 13a of the rolled eye 13, to blow away spatter and the like introduced upon welding at the above part. Therefore, after completion of the welding operation, the rolled eye-base cap body 18 can easily be removed from the columnar supporting body 61, since no spatter is introduced between the joint part 13a and the stopping member 63 to prevent the removal of the rolled eye-base cap body 18.

When the rolled eye-base cap body 18 cannot be removed and remains at the welding mechanism 17 due to spatter and the like introduced upon welding, the operation of the automatic welding apparatus must be interrupted every time the rolled eye-base cap body 18 cannot be removed from the welding mechanism 17. This will result in a degradation in the operation efficiency of the apparatus. However, in the present embodiment of the invention, the rolled eye-base cap body 18 can be positively removed from the welding mechanism 17 as described above. Accordingly, the automatic welding apparatus can be operated continuously without interruption, to obtain a maximum operation efficiency.

The rolled eye 13 supplied from the parts feeder 11 and the base cap 16 supplied from the parts feeder 12 are successively welded at the joint part 13a of the rolled eye 13, by repeatedly performing the above described operations. Thus, the rolled eye-base cap body 18 can be manufactured continuously and automatically.

In the above embodiment of the invention, the loader 14 has the pair of arms 21a and 21b which are reciprocally rotated in an angular range of ninety degrees. However, four arms can be provided at equi-distant positions in the peripheral direction of the loader 14, for example, to rotate the arms towards one direction to perform the above described operations.

Moreover, in the above embodiment of the invention, the automatic welding apparatus of the present invention is applied to a welding operation in which a rolled eye and a base cap is welded to form a rolled eye-base cap body of a shock absorber of an automobile. However, the present invention can be applied to any welding operation which requires a part to be positioned so that a joint part of that part is in a predetermined positional relationship with another part onto which the above part is to be welded.

Further, this invention is not limited to these embodiments but various variations and modifications may be made without departing from the scope of the invention.

What is claimed is:

1. An automatic welding apparatus comprising:
   positioning means successively supplied with a first workpiece, for positioning said first workpiece so that a joint part of said first workpiece faces toward a predetermined direction;
   holding and moving means for holding and moving the first workpiece which is positioned by said positioning means;
   holding means provided at a position opposing a second workpiece which is successively supplied, for receiving the first workpiece moved by said holding and moving means and holding said first workpiece in a state where the joint part of the first workpiece opposes said second workpiece, said holding means comprising a supporting member loosely inserted into said first workpiece, a stopping member inserted into a depression formed in said supporting member with a gap formed therebetween and movable in the diametrical direction of said first workpiece, said stopping member having a pointed end part projecting from said depression, and means for flowing compressed air within said depression even in a state in which the welding operation is performed, said stopping member being urged by a force in a direction projecting outward from said depression due to the compressed air supplied into said depression so that said pointed end part pushes against the joint part of said first workpiece, said compressed air being released at a part where said pointed end part pushes against said joint part; and
   welding means for welding said first workpiece held by said holding means and said second workpiece in a confronting state, at said joint part of said first workpiece.

2. An automatic welding apparatus as claimed in claim 1 in which said positioning means has a driving roller for making contact with the outer peripheral surface of said first workpiece and rotating said first workpiece, a motor for rotating said driving roller, and a sensor provided at a position opposing the rotating first workpiece, for detecting said joint part of said first workpiece, said motor being stopped when said sensor detects said joint part, said first workpiece being positioned at a position where said joint part faces towards a predetermined direction along the peripheral direction thereof.

3. An automatic welding apparatus as claimed in claim 2 in which said positioning means further has two pushing members for making contact with the outer peripheral surface of said first workpiece and operating together with said driving roller to support the outer peripheral surface of said first workpiece at three positions in a holding manner.

4. An automatic welding apparatus as claimed in claim 3 in which said two pushing members are both rollers.

5. An automatic welding apparatus as claimed in claim 1 in which said holding and moving means is a loader which rotates arms having chucks at the tip ends thereof, with a center provided at a predetermined position.

6. An automatic welding apparatus as claimed in claim 1 in which said first workpiece is a rolled mounting eye, and said second workpiece is a base cap.

* * * * *